April 16, 1968  D. ELFORD  3,378,050
APPARATUS FOR COORDINATING A FRUIT PROCESSING MACHINE
Filed Jan. 17, 1966  3 Sheets-Sheet 2
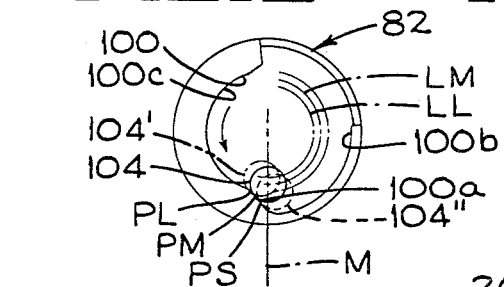
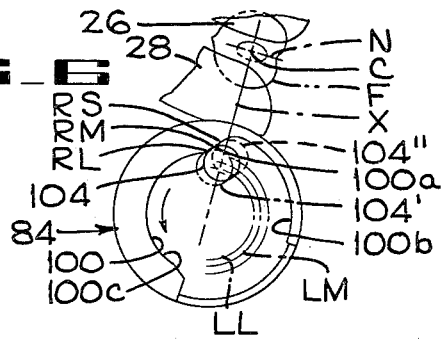
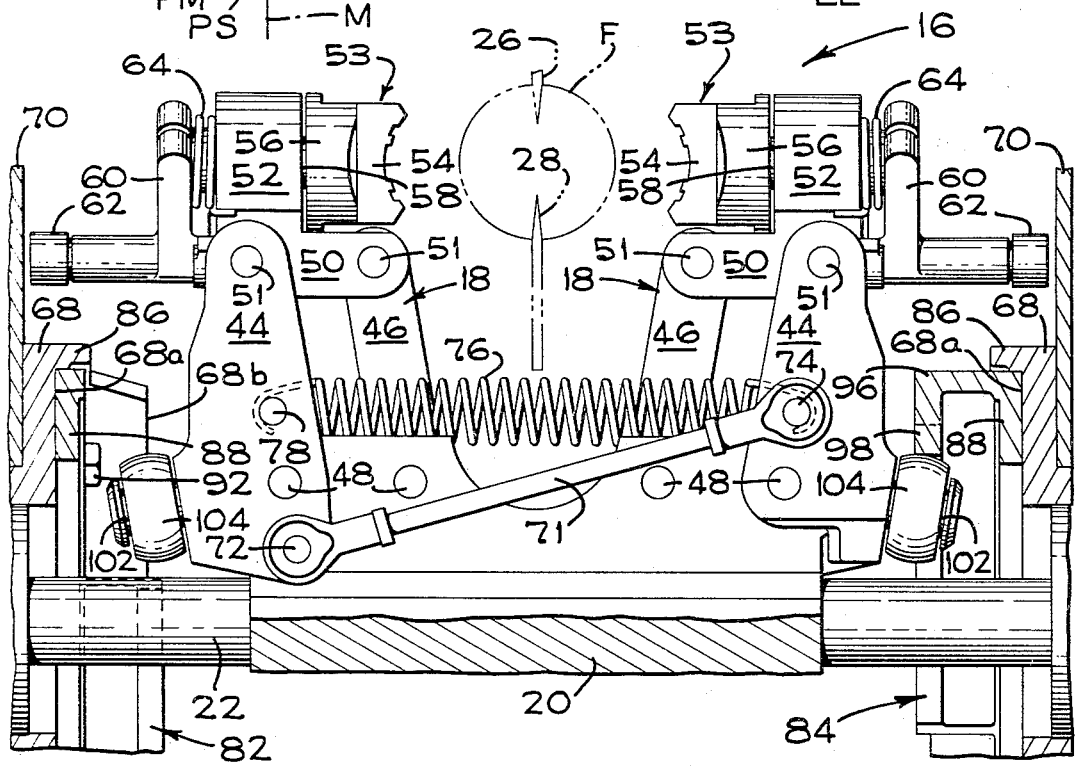
INVENTOR
DAVID ELFORD
BY Francis W. Anderson
ATTORNEY

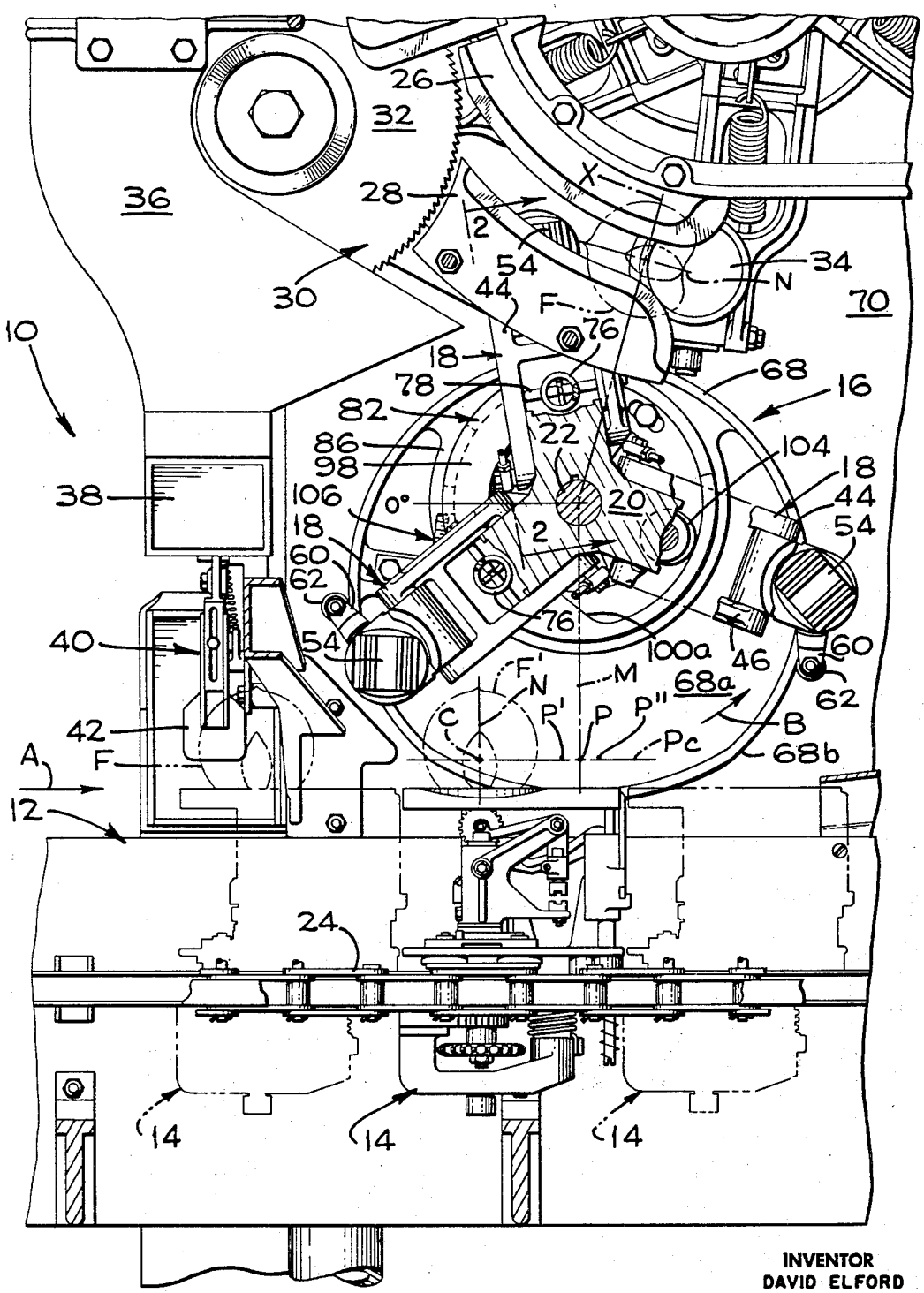
FIG_1

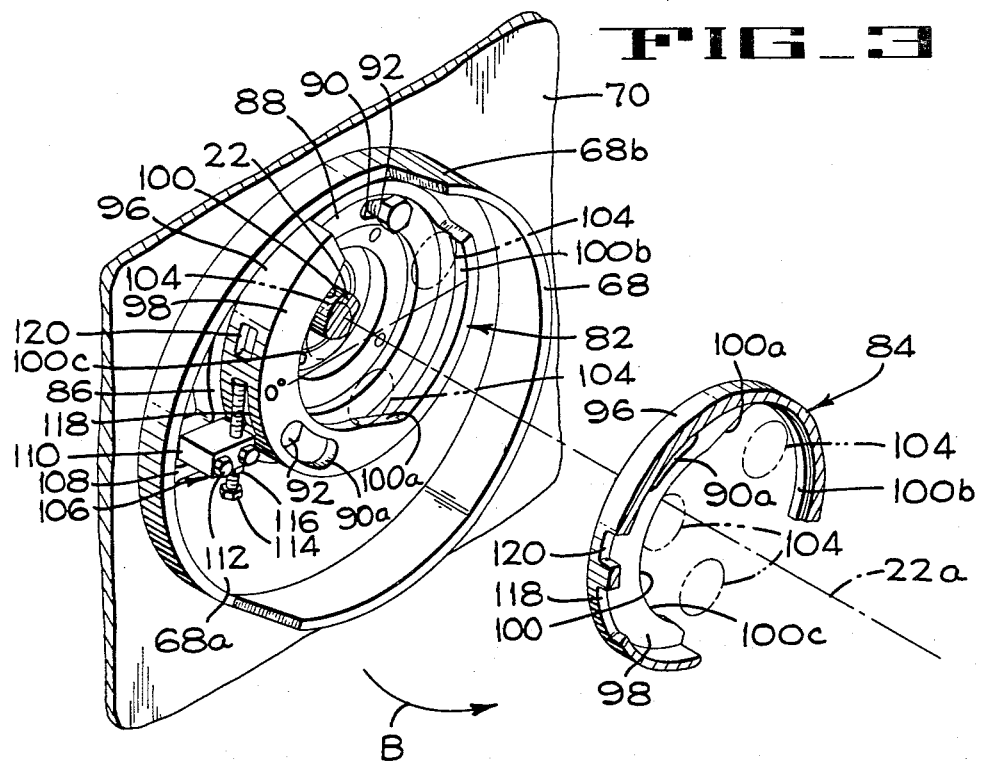
FIG_3
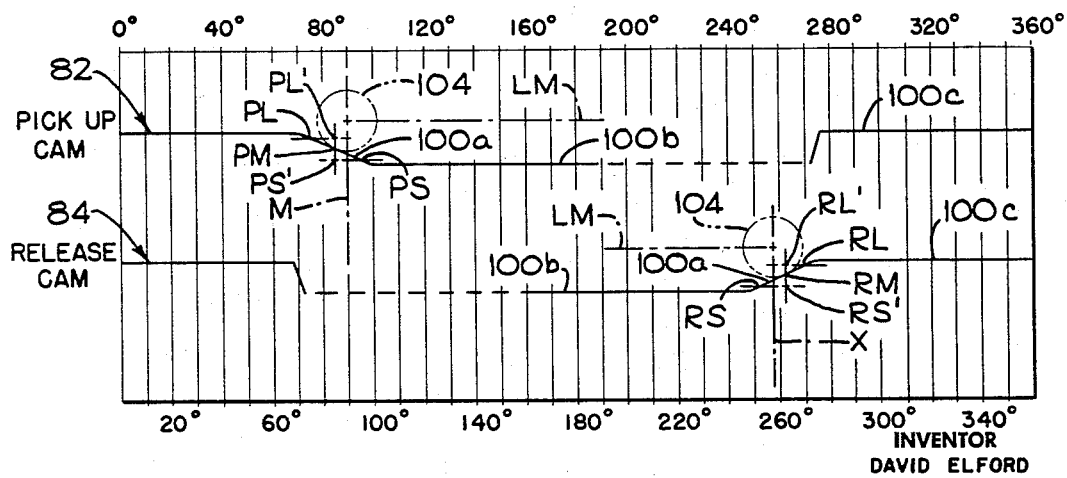
FIG_4

3,378,050
APPARATUS FOR COORDINATING A FRUIT PROCESSING MACHINE
David Elford, The Patch, Victoria, Australia, assignor to FMC Corporation, San Jose, Calif., a corporation of Delaware
Filed Jan. 17, 1966, Ser. No. 520,998
2 Claims. (Cl. 146—51)

ABSTRACT OF THE DISCLOSURE

In a peach pitter, the grippers on a transfer turret which pick up peaches from a conveyor and transfers them to slitting knives have their closing and opening motions individually and independently adjustable to insure precise pickup and delivery of batches of peaches of various sizes.

---

This invention relates to machines for automatically processing fruit, and more particularly to an apparatus for maintaining coordination between cooperating mechanisms of such machines.

The present invention concerns an improvement incorporated in the related inventions disclosed in my copending application, Ser. No. 426,745, filed Jan. 21, 1965, and entitled Fruit Handling Apparatus, now Patent No. 3,310,152; and the application of Lindsay G. Hill, Ser. No. 426,876, also filed Jan. 21, 1965, and entitled Fruit Processing Apparatus, now Patent No. 3,269,515.

Experience with the apparatus disclosed in the Elford application demonstrated the advisability of providing some means for conditioning the apparatus to process fruit of various sizes. One improvement directed to this objective is disclosed in the last mentioned Hill application.

The basic components of this type of fruit processing machine includes an endless conveyor circulating in a closed generally oval path. A series of closely adjacent fruit supporting carriages are secured to the conveyor and are arranged to receive fruit from a feed device; transport the fruit to a transfer mechanism, which is operated in timed relation with the conveyor; and orient the fruit as they travel from the feed device to the transfer mechanism. Fruit bisecting and pitting mechanisms are provided including a pair of stationary, laterally spaced, curved slitting knives, which substantially bisect the flesh of the fruit to the margin of the pit, and a slitting saw which completes the bisection and thereby produces fruit halves each of which contains a pit half.

The transfer mechanism is preferably provided with cooperating pairs of radially extending confronting arms which are pivotally mounted on a rotatable hub. As the hub rotates the arms are pivoted toward and away from each other with such pivotal movement being in part established by a cam. The arms of the transfer mechanism are positioned on opposite sides of the path of the fruit transporting and orienting carriages. As the carriages pass the transfer mechanism, one pair of arms are moved toward each other to engage the opposite sides of the fruit, remove the fruit from the carriages, and translate such fruit in an arc whereupon it is impaled on the slitting knives. At this stage, the arms are moved away from each other by the cam to thereby release the fruit that has been impaled.

As long as fruit within a certain range of sizes is being processed by the above, briefly-described apparatus, it operated with a very low percentage of improperly processed fruit, that it to say the fruit was properly oriented by the carriages locating the suture plane in the plane containing the slitting knives and the fruit was properly impaled on such knives. In addition, the transfer arms grasped and released the fruit at the appropriate instant. However, during the processing of what is termed "small fruit," problems arose regarding the interval of time between the grasping and release function of the arms. Since the arms must move inwardly toward each other a greater distance to engage a small fruit before it is able to be removed from the carriages, the arms do not grasp the fruit properly and the arrangement was such that the fruit was released prematurely before engagement with the slitting knives was established. This, of course, reduced the efficiency of the machine and resulted in loss of the fruit which was prematurely released.

This invention is primarily concerned with an arrangement of cams by which the grasping and release function of the arms can be regulated in accordance with the diameter of the fruit being processed so that each fruit is picked up at the point where the center of the gripping pads most nearly corresponds to the center of the fruit, and so that each fruit is released at the position in which its pit is in a desired orientation relative to the pitting mechanism into which it must move.

Accordingly, it is an object of this invention to insure proper processing of drupaceous fruit irrespective of the size of such fruit.

Another object is to provide an improved fruit transfer mechanism.

Another object of this invention is to adjust the pickup and release sequence of a transfer mechanism of the above described type in accordance with the size of the fruit being processed.

Another and more particular object of this invention is to prevent loss of fruit being processed by an automatic machine by being able to independently adjust the time required for performing one function of such machine.

Another object is to provide an improved actuating and control mechanism for a fruit transfer mechanism.

Other embodiments, advantages, objects, uses and applications of my invention will become apparent by referring to the drawings which are only illustrative of devices for accomplishing the objects of my invention but are not to limit the scope of my invention and in which:

FIGURE 1 is a fragmentary front elevation partially in section of a fruit processing machine incorporating the improvement of this invention;

FIGURE 2 is an enlarged fragmentary section taken substantially along the line 2—2 of FIGURE 1;

FIGURE 3 is a fragmentary perspective, with parts broken away, illustrating the relationship of the two cams associated with the arms of the transfer mechanism;

FIGURE 4 is a timing diagram illustrating the relationship of the cam surfaces for a single revolution of the transfer mechanism.

FIGURE 5 is a diagrammatic showing of the pickup cam and associated roller.

FIGURE 6 is a diagrammatic showing of the release cam and associated rollers.

Since the improvement disclosed in the present application is particularly adapted to be used with the machine shown and described in the above reference Elford application, only those elements of the Elford disclosure which are necessary for a complete understanding of the present invention are shown and described, it being understood that said Elford application is included by reference herein for a disclosure of any necessary parts of the machine.

FIGURE 1 shows a portion of the fruit processing machine of the Elford application incorporating the improvement of this invention, and it is generally indicated by the numeral 10. The main components of the illustrated structure include a fruit transporting and orienting mechanism 12 having a plurality of closely spaced carriages 14 which are constrained to travel in a generally oval horizontal orbit and are operative to receive a fruit F from a feeding device (not shown) and transport it to a transfer mechanism 16. The transfer mechanism comprises cooperating pairs of radially extending circumferentially spaced arms 18 mounted on a hub 20 which is, in turn, keyed to a rotating shaft 22. The carriages 14 are transported in their orbit by a suitable sprocket chain 24. At the portion of their orbit shown in FIGURE 1, the arms 18 of the transfer mechanism 16 are rotating in the direction of the arrow B.

A medium size fruit shown in phantom line and indicated by the letter F' supported by the middle one of the illustrated carriages 14 is being transported by the carriages in the direction of the arrow A. When the center C of the fruit is located at the point P it will be firmly engaged by the transfer arms 18 and transported in an arc, having its center at the center of the shaft 22, to a pair of arcuate vertically spaced slitting knives 26 and 28. The flesh of the fruit is bisected along its suture plane substantially to the margin of the pit. The knives are part of a bisecting and pitting apparatus 30 located in the position shown with respect to the fruit transporting and orienting mechanism 12 and the transfer mechanism 16.

The pitting and bisecting apparatus comprises a rotatable saw 32 positioned coplanar with the slitting knives 26 and 28 and operative to complete bisection of the fruit by cutting through the uncut portions of the flesh and serving the pit along its suture. Once the fruit is impaled upon the knives 26 and 28 by the transfer arms 18 it is released and it is then engaged by a pair of generally hemispherical opposed cups 34 (only one being shown) which carry the fruit along the arcuate path defined by the knives 26 and 28 into engagement with the saw 32 which, as stated, completes the bisection of the fruit. The saw 32 is provided with a guard 36 having its lower end connected to a refuse chute 38.

Below the saw guard there is mounted a reject mechanism 40 including a pivotally mounted paddle 42 which is effective to swing in a path transverse to the direction of movement of the carriages 14, for removing fruit from any individual carriage which is not properly oriented. The particular manner in which the reject mechanism operates is fully described in the above mentioned Elford application.

As a properly oriented fruit is being transported by the carriage 14 it is firmly engaged by the arms 18 at the point P, which is defined by the intersection of a vertical plane M and a construction line Pc, the line containing the centers C of each fruit. It will be noted that the plane M is vertical and it passes through the center of the shaft 22. The axis of symmetry of each fruit is designated by the line N and at the pickup point P it is substantially in the orientation shown in FIGURE 1.

After the fruit has been engaged by the arms 18 it is carried in an arc and impaled upon the splitting knives 26 and 28 with the axis of a symmetry N lying substantially midway between the cutting edges of the slitting knives. The manner in which this rotation of the fruit relative to the arms 18 occurs during translation from the point P to the knives will be explained in connection with the structure shown in FIGURE 2. Thus, according to the above described construction, a properly oriented fruit which arrives at the pickup point P is engaged by a pair of the arms 18 of the transfer mechanism 16; removed from the carriage and translated in an arc impaling the fruit on the knives 26 and 28; then the transfer cups 34 engage the fruit and move it along the knives 26 and 28 into engagement with the saw 32 which completes bisection of the fruit.

It will be noted in FIGURE 1 that, no matter what size the fruit is, the most advantageous pickup position is one in which the centers of the pickup pads 54 and the center C of the peach are in the vertical transverse plane M. When the centers are so located, the pads will be centered relative to the fruit and can effectively grip the fruit. For reference purposes, it will be assumed that the machine has initially been set to handle medium size fruit and that, when this setting is in effect, the pads will grip the fruit when the centers of the pads and the fruit are on plane M. If a fruit larger than a medium size fruit is being processed, when the machine has this setting, the inwardly moving pads will engage the surface of the peach sooner, as for example at point P'. If the fruit is smaller than a medium fruit, the pads will not engage the surface of the fruit until a later position, as for example position P'', is reached. The engagement of the fruit at points P' and P'' is undesirable. In FIGURE 5 the closing cam 82 is diagrammatically shown. Point PM indicates the position at which the follower roller 104, which is in radial alignment with the pads 54, will be on the transition camming surface 100a when the gripping pads 54 engage the surface of the fruit. It should be noted that the pads cannot move any further toward each other under the urging of the associated spring 76 and, accordingly, the roller 104 will not move any further toward the camming surface 100b, but will maintain its position on line LM as the pads 54 carry the fruit toward the release position. Point PL indicates the position at which the follower roller, indicated by reference numeral 104', will be on the camming surface 100a when the gripping pads engage a large fruit. It will be evident that for effective fruit pickup action, point PL must be shifted to a position at which the center of roller 104' is in the vertical plane M and, in accordance with the present invention, means is provided for so shifting the cam 82. Similarly, the point PS indicates the position at which the follower roller, indicated by numeral 104'', will be on the camming surface 100a when the gripping pads engage a small fruit. It will be evident that this point on the camming surface must be shifted to a position in which the center of roller 104'' is in plane M.

Considering now the release of the fruit after it has been positioned on the blades 26, 28 (FIG. 1), it should be noted that the peach should be deposited on the blades in a position such that its pit axis is substantially normal to a plane X that passes through the axis of shaft 22 and the axis of the shaft (not shown) around which the transfer cups 34 of the pitting mechanism orbit. With this pit orientation, the peach and its pit are in the most advantageous position for processing in the pitting mechanism.

In FIGURE 6, the release cam 84 is diagrammatically shown. Assuming that the cam has been set to process medium size fruit, point RM indicates the position at which the roller follower 104 will be on the transition camming surface 100a when the gripping pads release a fruit of medium size that is traveling along line LM. Point RL indicates the release position for a large fruit traveling along line LL. It will be evident that if this setting is maintained when large fruit are processed, the pits will attain the wrong terminal position and the gripping pads will scuff the surface of the fruit due to the fact that the blades tend to stop the movement of the peach as it is impaled thereon but the pads keep moving. A slight relative movement occurs that causes marring of the fruit surface. Accordingly, the release point RL must be shifted to position the center of the roller, indicated by numeral 104', in plane X. Similarly, point RS indicates the position at which the roller follower 104'' will be on camming surface 100a when the gripping pads release a small fruit. If this cam setting is maintained when small fruit is processed, the pits will attain the wrong terminal position and the fruit will not be impaled far enough on the blades 26, 28 to assure that it will not drop off. Accordingly, the release point RS must be shifted to position the center of the roller 104″ in plane X.

Referring now to FIGURE 2, there is shown an enlarged fragmentary portion of the transfer mechanism 16 which is identical to the transfer mechanism shown in FIGURE 27 of the above Elford application with the exception that there is incorporated in FIGURE 2 the novel structure of the present invention. As shown in FIGURE 2, each of the opposed arms 18 of the transfer mechanism includes outer and inner parallel links 44 and 46 which have inner ends pivotally connected to the hub 20 by pins 48. The outer ends of the links 44 and 46 are pivotally connected by pins 51 to a block 50, which is part of a gripper mounting member 52. A gripper head 53 is carried by each mounting member 52, each head including a pad 54 secured to a holder 56. Each of the holders is provided with a short shaft 58 rotatably supported in the gripper mounting member 52 and extending outwardly therefrom so that a cam follower bracket 60, including a roller 62, may be secured to the shaft 58. A torsion spring 64 is connected between each mounting of member 52 and the associated cam follower bracket 60 and is effective to urge the bracket 60 in a selected orientation relative to the adjacent arm 18. The roller 62 of each of the two gripper units is arranged to engage one of two identical drum cams 68 mounted in fixed position on the inner surface of the opposed side walls 70 which form part of a frame of the bisecting and pitting mechanism 30.

Each cam 68 has a rear wall 68a and a peripheral camming surface 68b, the configuration of which is shown best in FIGURE 1. As the transfer mechanism 16 rotates, the arms 18 and the rollers 62 move in an orbital path and, under the biasing of springs 64, become engaged with the surfaces 68b of the cams 68 causing a rotation of the holders 56 about shafts 58, against the bias of the springs 64, to orient the pads 54 in a desired position when the fruit is gripped by the pads at the point P. Continued rotation of the arms 18 and the shape of the cam 68 allow the torsion springs 64 to cause rotation of the holders 56 about shafts 58 so that the axis N of the fruit is located substantially midway between the cutting edges of the knives 26 and 28. Accordingly, it will be appreciated that the cams 68 and the springs 64 are effective to position the holders 56 to impale the fruit upon the knives 26 and 28 in the position shown in phantom lines in FIGURE 1. For a more detailed explanation of the construction of the construction and operation of the transfer turret reference should be made to the above mentioned Elford application.

The opposite pairs of parallel links 44 and 46 are interconnected by a tie-rod 71 having one end pinned at 72 below the pin 48 to one link 44 and the remaining end pinned at 74 above the pin 48 of the remaining link 44. By virtue of this tie rod, inward and outward movement of one pair of the parallel links 44 and 46 is transferred to the other. Accordingly, the arms are effective to move the blocks 50 and the gripper pads 54 simultaneously toward and away from each other. A tension spring 76, having one end attached to a pin 78 and the other end attached to the pin 74, is provided for urging the pairs of gripper arms toward each other thereby permitting the gripper pads 54 to engage a fruit. In order to hold these arms in an open position (the position illustrated in FIGURE 2) two identical cams 82 and 84 are provided. As seen in FIGURE 2, the cams 82 and 84 are mounted on opposite walls 70 of the pitter mechanism and, although they are identical in design, they face in opposite directions and their camming surfaces are differently oriented angularly relative to the shaft 22. Both cams control the arms 18 of the gripper units but, in general, they operate on the arms at different times, one cam being inoperative while the other cam controls the arms. Cam 82 controls the closing of the gripper pads and will be referred to as the closing cam; and cam 84 controls the opening of the pads to release the fruit and will be referred to as the release cam.

As shown best in FIGURE 1, the cam 82 surrounds the shaft 22 and is seated within a recess formed by a generally circular web 86 which is formed integrally with and extends inwardly from the rearward wall 68a of the adjacent drum cam 68. The cam 82 is provided with a radially inwardly extending flanged portion 88 through which are formed arcuate slots 90 (only one appearing in FIGURE 1) having bolts 92 disposed therein, each bolt being threaded into a tapped hole formed in the rearward wall 68a of the drum cam 68. The two slots 90 are formed on a circle about shaft 22 so that they provide guide means for effecting angular indexing movement of the cam 82 about shaft 22. As shown most clearly in FIGURE 3, each cam 82 and 84 is formed with a circumferential discontinuous wall 96 which extends axially inwardly relative to the wall 68a and a radially inwardly extending wall 98 that is parallel to flange 88 and has a cam surface 100 formed thereon. Through the wall 98 there is formed a clearance arcuate slot 90a in alignment with one of the arcuate slots 90. The slot 90a is of sufficient size to permit the insertion of a tool for turning of the associated bolt 92.

Each of the cams 82 and 84 is effective during the rotation of the transfer mechanism 16 to hold the gripping arms 18 in their open position during a certain portion of a complete revolution of the shaft 22. Referring to FIGURE 2 it will be seen that each link 44 is provided with a short stub shaft 102 on which is rotatably mounted a roller 104 that engages the sam surface 100 of the adjacent cam 82 or 84.

Referring now to FIGURE 3 there is indicated by the arrow B the direction of rotation of the shaft 22. The rollers 104 which are indicated in phantom, travel along the cam surfaces 100 of the cams 82 and 84. Considering pickup cam 82 (FIG. 3) it will be seen that the cam surface 100 has a gradual inclined portion 100a providing a transition surface between a large diameter portion 100b and a small diameter portion 100c. The release cam 84 has identical camming surfaces 100a–c. As a roller 84 moves toward the large diameter surface 100b of either cam the gripping arms 18 move toward their closed gripping position which will, of course, be determined by the size of the fruit. As the ramp, or inclined portion 100a is encountered by a particular roller 104 the arms associated therewith are gradually opened up with their maximum open position being achieved when the roller comes in contact with the surface 100c.

Each of these cams is provided with means to rotate the cams a required amount about the axis 22a of the shaft 22. Such means are generally indicated by the numeral 106 and is shown associated with the cam 82. Since these means for both cams are of identical construction, illustration and description of one will suffice for both cam adjusting means. Still referring to FIGURE 3, it will be seen that there is a lateral substantially horizontal web 108 projecting from the rearward wall 68a of the drum cam 68. On this web there is seated a small generally rectangular block 110 being secured to the wall 68a by a pair of bolts 112. The block 110 is provided with a tapped hole through which is threaded an upwardly extending bolt 114. The bolt is provided with a lock nut 116.

Through the circumferential wall 96 of the cam there is formed an elongate generally rectangular opening 118. The relative location of the parts is such that the end of the bolt 114 is engageable with one of the ends of the rectangular opening 118. This bolt is effective, when rotated, to cause rotation of the cam 82 in a clockwise direction about the axis 22a as viewed in FIGURE 3. This bolt however is not effective to cause adjustment of the cam 82 in the opposite direction. For this purpose there is provided another rectangular slot, 120 slightly above the rectangular slot 118, through which a bar or other lever may be inserted to locate the cam 82 in a counterclockwise direction, assuming however that the bolt 114 has been rotated displacing it downwardly to allow such movement.

The arcuate slots 90 permit adjustment of the cam 82 through an included angle of approximately 15 degrees since this amount of adjustment is considered to be adequate to properly process fruit of the minimum and maximum size encountered. It is to be understood, however, that it is within the skill of the art to increase or decrease the amount of adjustment as desired without departing from the spirit of this invention.

The manner in which the cam 82 is adjusted will now be described. It is to be understood that the same applies to the cam 84 although the adjusting means has not been shown since it is of an identical character. Assuming it is desired to rotate the cam 82 in a clockwise direction as viewed in FIGURE 3 it is first necessary to loosen the bolts 92 allowing the cam 82 to be rotated. The lock nut 116 is loosened, running it downwardly toward the head of the bolt 114. The bolt 114 is then rotated in the direction appropriate to its hand displacing the bolt upwardly which would, in turn, rotate the cam 82 clockwise since the end of the bolt 114 is in engagement with the end of the rectangular opening 118. After the adjustment has been completed the bolts 92 and the lock nut 116 are tightened thereby holding the cam 82 in its adjusted position.

In describing the overall operation of the novel arrangement of this invention it will be first assumed that the pickup cam 82 and the release cam 84 are adjusted to handle peaches or fruit of medium size. It will also be assumed for purposes of this description that the fruit is engaged by the pickup arms at the point P when the rollers 104 are located midway on the inclined portion 100a. This relationship is shown in FIGURE 1 wherein the inclined portion 100a appears in solid outline and in the timing diagram of FIGURE 4 wherein the setting of the cam 82 for medium size fruit is shown by a solid line. The release came 84 is also adjusted to release medium size fruit at the appropriate time.

For purposes of discussion, the zero degree position of the diagram of FIGURE 4 has been chosen as corresponding to points on the cams 82 and 84 that are located 90° removed from the vertical transverse plane M, the zero position being indicated in FIGURE 1. Accordingly, when a pair of gripper pads 54 start moving downwardly from the zero position toward the pickup zone at point P, the follower rollers 104 associated with cams 82 and 84 move along the camming surfaces 100c of the cams. The surface 100c of cam 84 terminates near the 70 degree position (FIG. 4) and then the gripping pads are under the sole control of cam 82. When the roller 104 rides along the inclined surface 100a of cam 82 the pads move toward each other and grip the theoretical medium size fruit when the periphery of the roller reaches point PM on the camming surface and the center of the roller reaches the desirable pickup position in plane P.

Since the fruit itself prevents the pads from moving further inwardly, the follower rollers 104 move along the lines LM until the roller associated with the release cam 84 engages the camming surface 100a of that cam at point RM. It should be noted that the gripper pads are then under control of cam 84 and that the rollers 104 are then in plane X, the desired plane for transfer to the pitting mechanism.

As previously mentioned, if a large fruit is being processed, the cam 82 must be adjusted so that cam-surface pickup point PL will be on the same degree position as PM, said adjusted position being indicated by reference letter PL'. Also cam 84 must be adjusted to move cam-surface release point RL to the degree position of RM, as indicated by letter RL'.

If a small fruit is being processed, the cams must be adjusted to move cam-surface pickup point PS to point PS', and to move the cam surface release point RS to point RS'.

From the foregoing description it will be seen that the invention provides a simple, efficient mechanism for controlling the pickup and release operations of a fruit transfer mechanism and for varying the timing of one operation independently of the timing of the other operation.

Having thus described the invention, what is claimed as new and desired to be protected by Letters Patent is:

1. Fruit bisecting apparatus of the type comprising a conveyor carrying individual fruit supports pass a fruit pick up zone, fruit slitting knife means for receiving fruit from said conveyor, a rotary transfer turret having opposed fruit grippers for picking up fruit at said conveyor zone and depositing it on said knife means, and gripper actuators comprising means for closing the grippers on fruit at said pick up zone and means for opening the grippers at said knife means; the improvement wherein means are provided for adjusting the gripper closing means in one direction for retarding closing motion of the grippers on large fruit and in the opposite direction for advancing closing motion of the grippers on small fruit, and wherein means are also provided for independently adjusting the gripper opening means in one direction for advancing opening motion of the grippers on large fruit and in the opposite direction for retarding opening motion of the grippers on small fruit.

2. The apparatus of claim 1, wherein said gripper closing and opening means each comprises a separate cam, there being separate cam followers on said grippers, said cams being individually and independently movable for advancing and retarding their respective actions on their followers.

References Cited

UNITED STATES PATENTS

| 2,969,867 | 1/1961 | McClelland | 198—33 |
| 3,118,530 | 1/1964 | Harrer et al. | 198—33 |

W. GRAYDON ABERCROMBIE, *Primary Examiner.*